(12) United States Patent
Narayanan

(10) Patent No.: US 10,887,710 B1
(45) Date of Patent: Jan. 5, 2021

(54) CHARACTERIZING ENVIRONMENT USING ULTRASOUND PILOT TONES

(71) Applicant: Amazon Technologies, Inc., Seattle, WA (US)

(72) Inventor: Preethi Parasseri Narayanan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 15/132,058

(22) Filed: Apr. 18, 2016

Related U.S. Application Data

(63) Continuation of application No. 13/627,862, filed on Sep. 26, 2012, now Pat. No. 9,319,816.

(51) Int. Cl.
*H04R 29/00* (2006.01)
*G10L 15/065* (2013.01)
*G10L 17/10* (2013.01)
*H04R 3/04* (2006.01)

(52) U.S. Cl.
CPC .......... *H04R 29/004* (2013.01); *G10L 15/065* (2013.01); *G10L 17/10* (2013.01); *H04R 3/04* (2013.01)

(58) Field of Classification Search
CPC ....... H04R 29/004; H04R 3/04; G10L 15/065; G10L 17/10; G10L 21/0208; G10L 21/0264; G10L 21/028; G10L 2021/02082; G10L 15/06; G10L 15/07; G10L 15/18; G10L 15/183; G10L 15/187
USPC .......................................................... 381/59
See application file for complete search history.

(56) References Cited

U.S. PATENT DOCUMENTS

| 7,418,392 | B1 | 8/2008 | Mozer |
| 7,720,683 | B1 | 5/2010 | Vermeulen et al. |
| 7,774,204 | B2 | 8/2010 | Mozer et al. |
| 9,111,542 | B1 | 8/2015 | Hart et al. |
| 2002/0138272 | A1* | 9/2002 | Bennett ............... G10L 15/065 704/270 |
| 2006/0153391 | A1 | 7/2006 | Hooley et al. |
| 2006/0206724 | A1 | 9/2006 | Schaufele et al. |
| 2006/0221769 | A1 | 10/2006 | Van Loenen et al. |
| 2006/0235684 | A1* | 10/2006 | Chang ................... G10L 15/30 704/233 |

(Continued)

FOREIGN PATENT DOCUMENTS

WO WO2011088053 7/2011

*Primary Examiner* — Davetta W Goins
*Assistant Examiner* — Daniel R Sellers
(74) *Attorney, Agent, or Firm* — Lee & Hayes, P.C.

(57) ABSTRACT

A voice-activated computing device configured to transmit a pilot tone and then capture or receive a signal, which corresponds to the pilot tone, reflected from within the environment containing the voice-activated computing device. The voice-activated computing device, or some other computing system or device, analyzes the received signal in order to determine analyze one or more characteristics present within the signal, i.e. noise, echo, etc. Based upon the analysis, models for signal processing can be determined, selected and/or altered. Future signals received by the voice-activated computing device can be processed with such models. The analysis can also allow for the models to be dynamically updated and for models to be dynamically created.

20 Claims, 5 Drawing Sheets

(56) References Cited

U.S. PATENT DOCUMENTS

| | | | |
|---|---|---|---|
| 2006/0256974 A1* | 11/2006 | Oxford | H04R 3/005 |
| | | | 381/66 |
| 2007/0116306 A1 | 5/2007 | Riedel | |
| 2007/0133813 A1 | 6/2007 | Morishima | |
| 2007/0173212 A1 | 7/2007 | Mergler | |
| 2007/0198263 A1* | 8/2007 | Chen | G10L 15/065 |
| | | | 704/246 |
| 2008/0232608 A1 | 9/2008 | Ullmann | |
| 2009/0204410 A1* | 8/2009 | Mozer | G10L 15/30 |
| | | | 704/275 |
| 2011/0178798 A1* | 7/2011 | Flaks | G10L 21/0208 |
| | | | 704/226 |
| 2011/0307253 A1* | 12/2011 | Lloyd | G10L 15/20 |
| | | | 704/233 |
| 2012/0223885 A1 | 9/2012 | Perez | |
| 2014/0201639 A1* | 7/2014 | Savolainen | G10L 17/26 |
| | | | 715/727 |
| 2015/0086021 A1 | 3/2015 | Hardacker et al. | |
| 2015/0287405 A1* | 10/2015 | Biadsy | G10L 15/18 |
| | | | 710/257 |

* cited by examiner

CHARACTERIZING ENVIRONMENT USING ULTRASOUND PILOT TONES

RELATED APPLICATIONS

This application is a continuation of U.S. patent application Ser. No. 13/627,862, filed Sep. 26, 2012, entitled "Characterizing Environment Using Ultrasound Pilot Tones", of which is incorporated herein by reference.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech. However, the environment within which the speech occurs can affect the ability to interact with computing devices, since the computing devices must be able to recognize and discern the speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
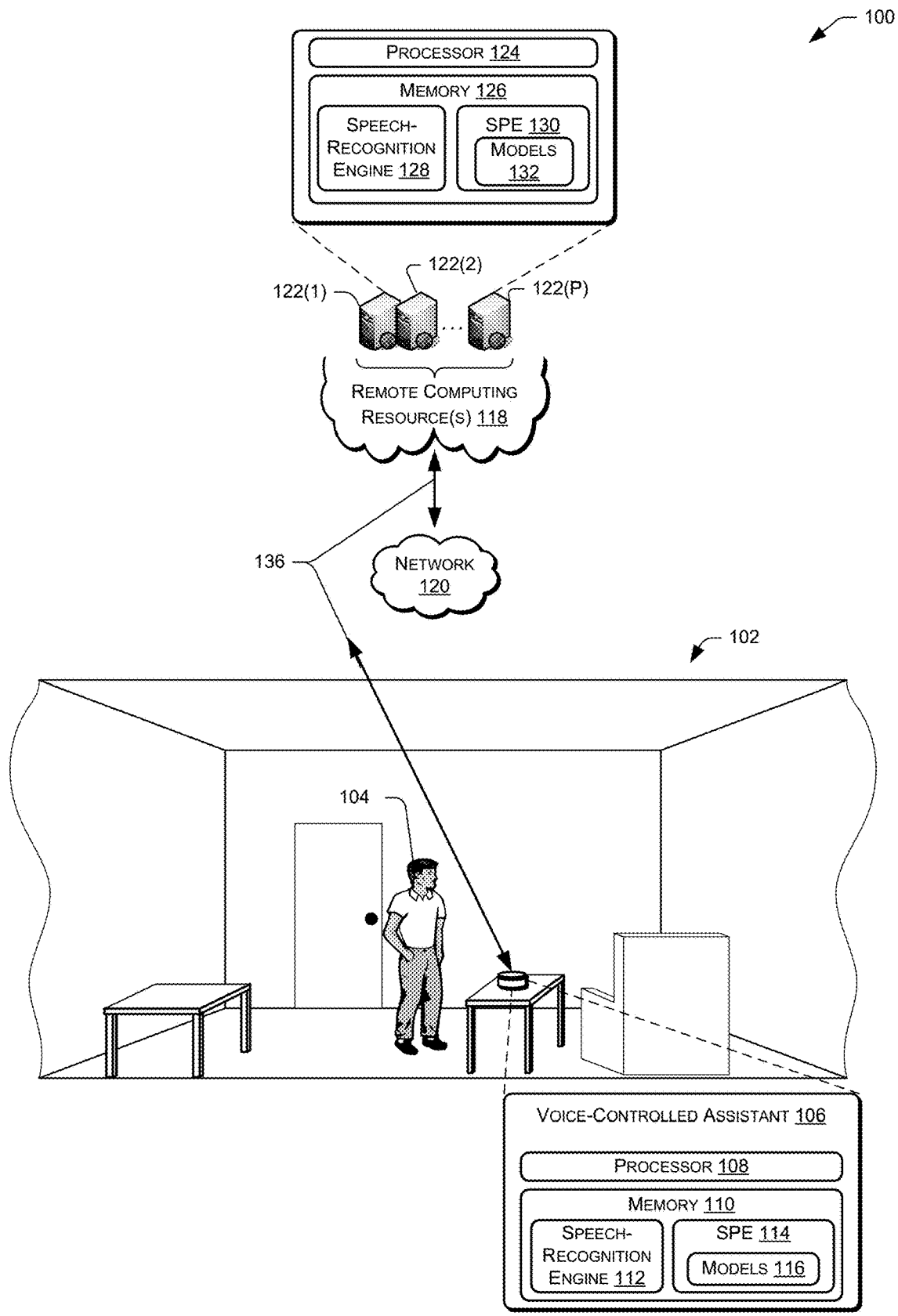
FIG. 1 shows an illustrative voice interaction computing architecture set in a home environment.

This disclosure describes, in part, a voice-activated computing device configured to transmit a pilot tone and then capture or receive a signal that corresponds to the pilot tone. In some instances, the signal is reflected from within the environment containing the voice-activated computing device. The voice-activated computing device, or another computing system or device, analyzes the received signal in order to analyze one or more characteristics present within the received signal, such as noise, echo, and the like. Based upon the analysis, models for signal processing can be determined, selected and/or altered such that future signals received by the voice-activated computing device can be processed with such models. That is, by better understanding acoustic characteristics of the environment in which the device resides, the device is able to perform more accurate speech recognition within the environment. Furthermore, the analysis can also allow for the models to be dynamically updated and for models to be dynamically created.

The voice-activated computing device generally includes a microphone and a speaker for audibly interacting with a user. The voice-activated computing device may additionally include one or more network interfaces (e.g., a wireless network interface, a wired network interface, etc.). This network interface may be used to connect the voice-activated computing device to one or more networks, such as a wireless network available in a home or business in which the voice-activated computing device is located, a wired network to which the voice-activated computing device physically couples, and the like.

Since the voice-activated computing device is configured to accurately recognize and discern audio signals received from one or more users, it is important that the audio signals from the one or more users be accurately handled by the voice-activated computing device. Since many factors within the environment of the voice-activated computing device can affect the audio signals from the users, it can be helpful to know ahead of time how the environment affects audio signals from the users. Factors that can affect the audio signals include, but are not limited to, the size of the room, the shape of the room, the number of windows within the room, the furniture within the room, appliances within the room, people within the room, animals in the room, etc.

To help understand these characteristics of an environment in a voice-activated computing device resides, the device periodically emits pilot tones. The device then receives back signals that correspond to the pilot tones, with these received signals having been reflected off of objects within the environment. A signal processing engine of the voice-activated computing device then analyzes the received signals. The analysis can be done using a model already included at the voice-activated computing device, or a model that can be developed or created dynamically. Alternatively, the analysis can be performed by a signal processing engine of a different computing system or computing device that is in communication with voice-activated computing device.

Since the voice-activated computing device knows the characteristics of the pilot tones emitted into the environment, the differences associated with the signals received back at the voice-activated computing device with respect to the pilot tones can be ascertained. Based upon the analysis, the voice-activated computing device can select a model for processing of signals received by the voice-activated computing device. Additionally, models can be updated and/or created dynamically. Thus, when an audio signal is received from one or more users of the voice-activated computing device, the voice-activated computing device can be better prepared to process signals received from the one or more users of the voice-activated computing device.

In addition, since conditions within the environment can change due to objects, people and/or animals coming into or out of the room, people and/or animals moving around the room, as well as activation of appliances or deactivation of appliances (e.g., televisions, radios, computers, refrigerators, washing machines, etc.), the models used for analyzing received signals may be changed and/or updated. By periodically emitting pilot tones, the voice-activated computing device can continually or periodically monitor and update selection and/or content of models for processing received signals based upon the received signals that correspond to a pilot tone.

As previously noted, the signal processing engine can select a model and can, based upon analysis, update the model, thereby allowing for dynamically processing of the received signals. The voice-activated computing device can include multiple microphones for capturing sounds and generating corresponding audio signals, and multiple speakers for output audio, including the pilot tones.

In some instances, the pilot tones are emitted at a predetermined periodicity. In other instances, the pilot tones are emitted off and on for some period of time after activation of the voice-controlled computing device. Activation of the voice-controlled computing device can occur manually or automatically. Such automatic activation can include, for example, detection of a sound by the voice-controlled device, detection of movement by the voice-controlled device, detection of a change in lighting in the environment, or the like. In some instances, the device emits pilot tones from time to time during the day even if the voice-controlled computing device is not in use.

The devices and techniques described above may be implemented in a variety of different architectures and contexts. One non-limiting and illustrative implementation is described below.

Illustrative Environment

FIG. 1 shows an illustrative voice interaction computing architecture 100 set in a home environment 102 that includes a user 104. The architecture 100 includes an electronic voice-controlled device 106 with which the user 104 may interact. In the illustrated implementation, the voice-controlled device 106 is positioned on a table within a room the home environment 102. In other implementations, it may be placed in any number of locations (e.g., ceiling, wall, in a lamp, beneath a table, under a chair, etc.). Further, more than one device 106 may be positioned in a single room, or one device may be used to accommodate user interactions from more than one room.

The voice-controlled device 106 has at least one microphone and at least one speaker to facilitate audio interactions with the user 104 and/or other users. Generally though, the voice-controlled device 106 includes a plurality of microphones and a plurality of speakers. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 3.

The microphone of the voice-controlled device 106 detects audio from the environment 102, such as sounds uttered from the user 104. As illustrated, the voice-controlled device 106 includes a processor 108 and memory 110. The memory 110 stores, or otherwise has access to, a speech-recognition engine 112. As used herein, a processor may include multiple processors and/or a processor having multiple cores. The speech-recognition engine 112, meanwhile, performs speech recognition on audio captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

The memory 110 also stores, or otherwise has access to, a signal processing engine (SPE) 114 that includes, or otherwise has access to, models 116. The signal processing engine 114 processes signals received by the voice-controlled device 106 through its microphone(s) in order to reduce or remove unwanted components of the signals such as, for example, noise, echo, etc.

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing devices 118 include "on-demand computing", "software as a service (SaaS)", "platform computing", "network-accessible platform", "cloud services", "data centers", and so forth.

The servers 122(1)-(P) include a processor 124 and memory 126. The memory 126 may store, or otherwise, have access to a speech-recognition engine 128 for recognizing speech and, potentially, causing performance of an action in response. The voice-controlled device 106 may utilize the speech-recognition engine 128 in addition to, or instead of, the speech-recognition engine 112. For instance, when the voice-controlled device 106 is able to connect to the remote computing resources 118 via the network 120, the voice-controlled device 106 may upload audio data to the remote computing resources 118 for processing. In some implementations, the remote computing resources 118 have a computational capacity that far exceeds the computational capacity of the voice-controlled device 106. Therefore, the voice-controlled device 106 may utilize the speech-recognition engine 128 for performing relatively complex analysis on audio captured from the environment 102.

In some implementations, the voice-controlled device 106 may receive vocal input from the user 104 and may perform speech recognition locally at the engine 112 and/or remotely at the resources 118. In either instance, the vocal input may be interpreted to form an operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth.

The memory 126 also stores, or otherwise has access to, a signal processing engine (SPE) 130 that includes, or otherwise has access to, models 132. The voice-controlled device 106 may utilize the speech-recognition engine 128 in addition to, or instead of, the signal processing engine 114. For instance, when the voice-controlled device 106 is able to connect to the remote computing resources 118 via the network 120, the voice-controlled device 106 may upload signals to the remote computing resources 118 for processing. As previously noted, in some implementations, the remote computing resources 118 have a computational capacity that far exceeds the computational capacity of the voice-controlled device 106. Therefore, the voice-controlled device 106 may utilize the signal processing engine 130 for performing relatively complex analysis on signals captured from the environment 102.

The voice-controlled device 106 may communicatively couple to the network 120 via wired technologies (e.g., wires, USB, fiber optic cable, etc.), wireless technologies (e.g., RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In order for the voice-controlled device 106 to accurately understand commands from the user 104, it is important for other characteristics of audio signals received by the voice-controlled device 106, such as, for example, noise, echo, and the like, to not overly interfere with the processing of the audio signals by the speech recognition engine 112. Since characteristics of the environment 102 can interfere with the voice signals of the user 104, it is advantageous to understand how the environment 102 may interfere with the voice signals of the user 104. Characteristics of the environment 102 can include, but are not limited to, the size of the room, the shape of the room, the number of windows within the room, the furniture within the room, appliances within the room, people within the room, animals in the room, people and/or animals coming into or out of the room, people and/or animals moving around the room, as well as activation of appliances or deactivation of appliances, i.e. televisions, radios, computers, refrigerators, washing machines, etc.

Figure 2A:
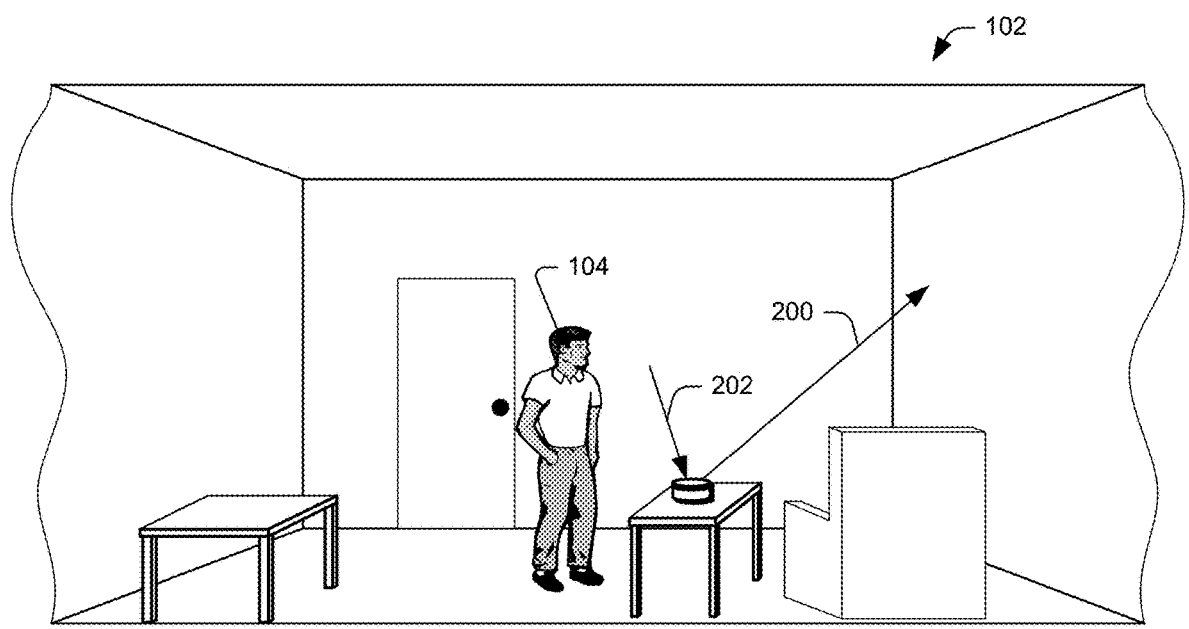
FIG. 2A shows a voice-controlled device emitting pilot tones and receiving signals that include components corresponding to pilot tones within the home environment of FIG. 1.

Referring to FIG. 2A, in accordance with the present disclosure, the voice-controlled device 106 emits pilot tones, as indicated by arrow 200. Reflected signals corresponding to pilot tones are received by the voice-controlled device 106 (indicted by arrow 202). Due to interference created by the environment 102, the received signals generally include characteristics, such as, for example, noise, echo, and the like, in addition to the pilot tone. In some instances, the pilot tones are non-audible, ultrasonic signals. In other instances, the pilot tones may comprises audible tones.

The signal processing engine 114 may receive signals based on the reflected pilot tones and, in response, may identify the characteristics of the received signals. The engine 114 may then use this identified information to create and/or modify the models 116. The speech recognition engine 112 or 128 may then use these models when analyzing audio signals based on subsequently captured sound. That is, by determining the characteristics of the environment 102 and taking this information into account when performing speech recognition, the device 106 is able to more accurately recognize any speech within generated audio signals.

Figure 2B:
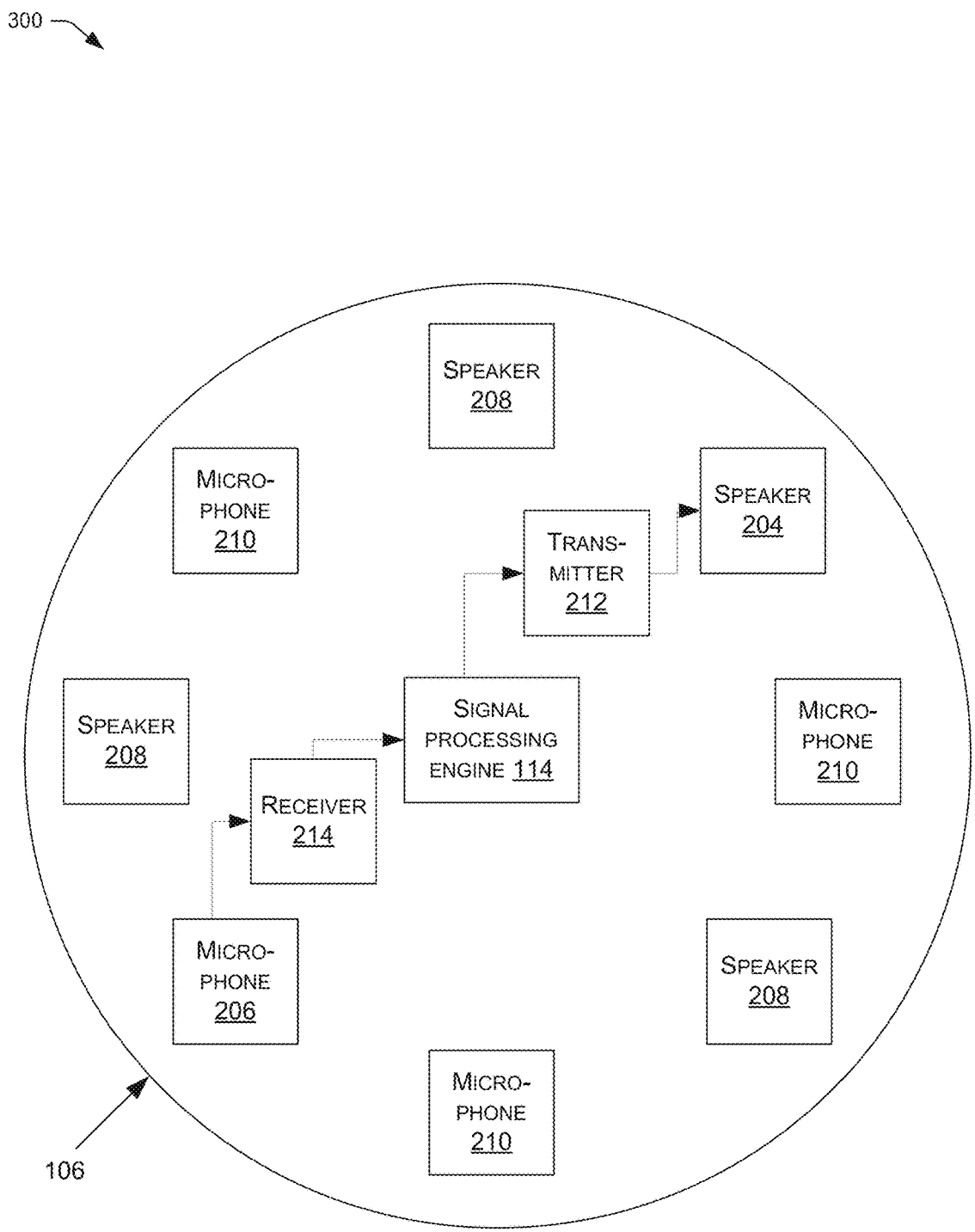
FIG. 2B shows the voice-controlled device with microphones and speakers.

Referring to FIG. 2B, the pilot tones may be emitted from one or more dedicated speakers 204 configured for handling ultrasonic signals. The pilot tones will travel through the environment 102 and reflected signals corresponding to the pilot tones may be received by one or more dedicated microphones 206 configured for handling ultrasonic signals. By including dedicated speaker 204 and microphone 206, the emission and reception of the pilot tones do not interfere with the overall functioning of the voice-controlled device 106, i.e. the functioning of speakers 208 and microphones 210 for users of the voice-controlled device 106.

A transmitter 212 produces and emits the pilot tones through the dedicated speaker 204. A receiver 214 receives, from the dedicated microphone 206, the reflected signals that correspond to pilot tones. The signal processing engine 114 analyzes characteristics of the received reflected signals that correspond to the pilot tones in order to determine how characteristics of the pilot tones may have been altered. Since the characteristics of the pilot tones are known, based upon the analysis, the signal processing engine 114 can select or dynamically create a model for processing future received signals in order to reduce or eliminate characteristics such as, for example, noise, echo, and the like. For initial analysis of received reflected signals, characteristics of the environment 102 can be considered by the signal processing engine 114. Characteristics of the environment 102 can include, but are not limited to, time of day, the size of the room, the shape of the room, the number of windows within the room, the furniture within the room, appliances within the room, people within the room, animals in the room, and the like. Characteristics of the environment 102 can be programmed into the voice-controlled device 106 by a user 104. A signal processing model can be used for future analysis and processing of signals that include components corresponding to pilot tones.

Based upon the processing, the signal processing engine 114 can also alter characteristics of future pilot tones that are emitted from the dedicated speaker 204. Alternatively, the analysis of the received reflected signals that correspond to the pilot tones can be performed by a signal processing engine of a different computing system or computing device that is in communication with voice-activated computing device. For example, the analysis of the received reflected signals that correspond to the pilot tones can be performed by a signal processing engine can be performed by the remote computing resources 118.

Based upon the analysis of the environment 102 through the pilot tones, the signal processing engine 114 can provide information to the speech recognition engine 112 in order to allow the speech recognition engine 112 to more efficiently and/or more accurately process signals received, through the microphones 210, from users of the voice-controlled device 106. Additionally, the speech recognition engine 112 can utilize the signal processing model utilized by the signal processing engine 114 to process audio signals received by the general speakers 208.

Pilot tones can be periodically emitted and reflected signals corresponding to pilot tones can be periodically received. The received signals corresponding to pilot tones can be statistically analyzed in order to pick a model for processing of received signals, either signals received at the dedicated microphone 206 or signals received at the general microphones 210, for processing of received signals. The statistical analysis can also be used to develop signal processing models and update current signal processing models.

In general, the voice-controlled device 106 has the microphones 206, 210 on all the time. However, the microphones 206, 210 can be turned off to conserve power if desired. In such a situation, the repeated production of pilot tones will generally only occur upon activation of the voice-controlled device 106. Activation of the voice-controlled device 106 can occur manually or automatically. Such automatic activation can include, for example, detection of a sound by the voice-controlled device 106, detection of movement by the voice-controlled device 106, detection of a change in lighting in the environment 102, etc. However, it can be desirable to emit pilot tones from time to time during the day even if the voice-controlled device 106 is not in use. Thus, the voice-controlled device 106 may automatically activate and de-activate throughout the day to allow for emission of pilot tones and analysis of received signals that include a component corresponding to the pilot tones.

The periodicity of sending pilot tones can be varied based upon conditions such as, for example, time of day, day of the week, etc. Based upon analysis of either signals received that include the pilot tones or signals received from user 104, the voice-controlled device 106 can instruct the user to perform a task. For example, the voice-controlled device 106 may instruct the user 104 to lower ambient noise in the environment 102 and/or instruct the user 104 to come closer.

Illustrative Voice-Controlled Device

Figure 3:
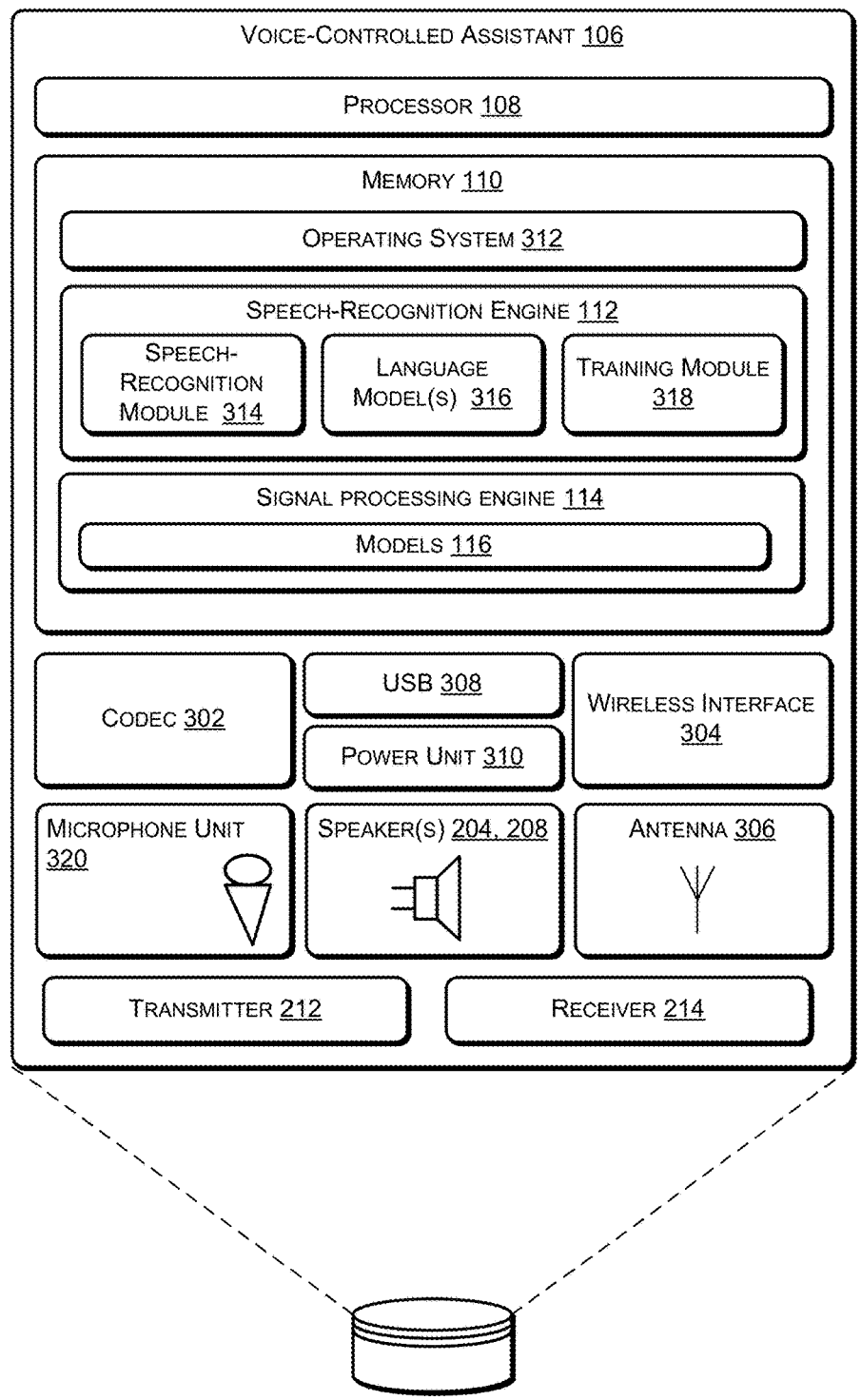
FIG. 3 shows a block diagram of selected functional components implemented in the voice-controlled device of FIG. 1.

FIG. 3 shows selected functional components of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The voice-controlled device 106 includes a microphone unit 320. The microphone unit 320 comprises the dedicated microphone 206, and one or more general microphones 210 to receive audio input, such as user voice input. The voice-controlled device 106 also includes the dedicated speaker 204, and one or more general speakers 208 to output audio sounds. A codec 302 is coupled to the microphone unit 320 (e.g., to the general microphones 210) and general speakers 208 to encode and/or decode the audio signals. The codec 302 may be coupled to the dedicated microphone 206 of the microphone unit 320 and the dedicated speaker 204 to encode and/or decode the pilot tones and received signals that include components corresponding to the pilot tones. The codec 302 may convert audio data between analog and digital formats. A user may interact with the voice-controlled device 106 by speaking to it and one or more of the general microphones 210 of the microphone unit 320 capture the user speech. The codec 302 encodes the user speech and transfers that audio data to other components. The voice-controlled device 106 can communicate back to the user by emitting audible statements through one or more of the general speakers 208. In this manner, the user interacts with the voice-controlled device 106 simply through speech, without use of a keyboard or display common to other types of devices.

In the illustrated example, the voice-controlled device 106 includes a wireless interface 304 coupled to an antenna 306 to facilitate a wireless connection to a network. The wireless interface 304 may implement one or more of various wireless technologies, such as wifi, Bluetooth, RF, and so on.

A device interface 308 (e.g., USB, broadband connection, etc.) may further be provided as part of the device 106 to facilitate a wired connection to a network, or a plug-in network device that communicates with other wireless networks. A power unit 310 is further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be a simple light element (e.g., LED) to indicate a state such as, for example, when power is on. But, otherwise, the device 106 does not use or need to use any input devices or displays in some instances.

Several modules such as instruction, datastores, and so forth may be stored within the memory 110 and configured to execute on the processor 108. An operating system module 312 is configured to manage hardware and services (e.g., wireless unit, Codec, etc.) within and coupled to the device 106 for the benefit of other modules.

In addition, the memory 110 may include the speech-recognition engine 112, discussed above. As illustrated, the speech-recognition engine 112 may include a speech-recognition module 314, one or more language models 316, and a training module 318. The speech-recognition module 314 may function to decode audio to identify sounds within the audio. The speech-recognition module 314 may then identify character strings either spoken or spelled from the audio based on the identified sounds. The speech-recognition module 314 may perform this speech recognition with reference to the one or more language models 316. In some instances, the voice-controlled device 106 utilizes a language model that is specifically designed to assist the speech-recognition module 314 in identifying sounds corresponding to particular graphemes, such as letters, numbers, symbols, and/or the like. In addition, the speech-recognition engine 112 may utilize the training module 318 to retrain the language model(s) 316 or other language models based on interaction with a user.

The voice-controlled device 106 also includes the transmitter 212 and receiver 214. The transmitter 212 and receiver 214 can be combined into a single transceiver if desired. The voice-controlled device 106 also includes the signal processing engine 114 and signal processing models 116. In accordance with an embodiment, the voice recognition engine 112 and the signal processing 114 are a single engine.

Illustrative Processes

Figure 4:
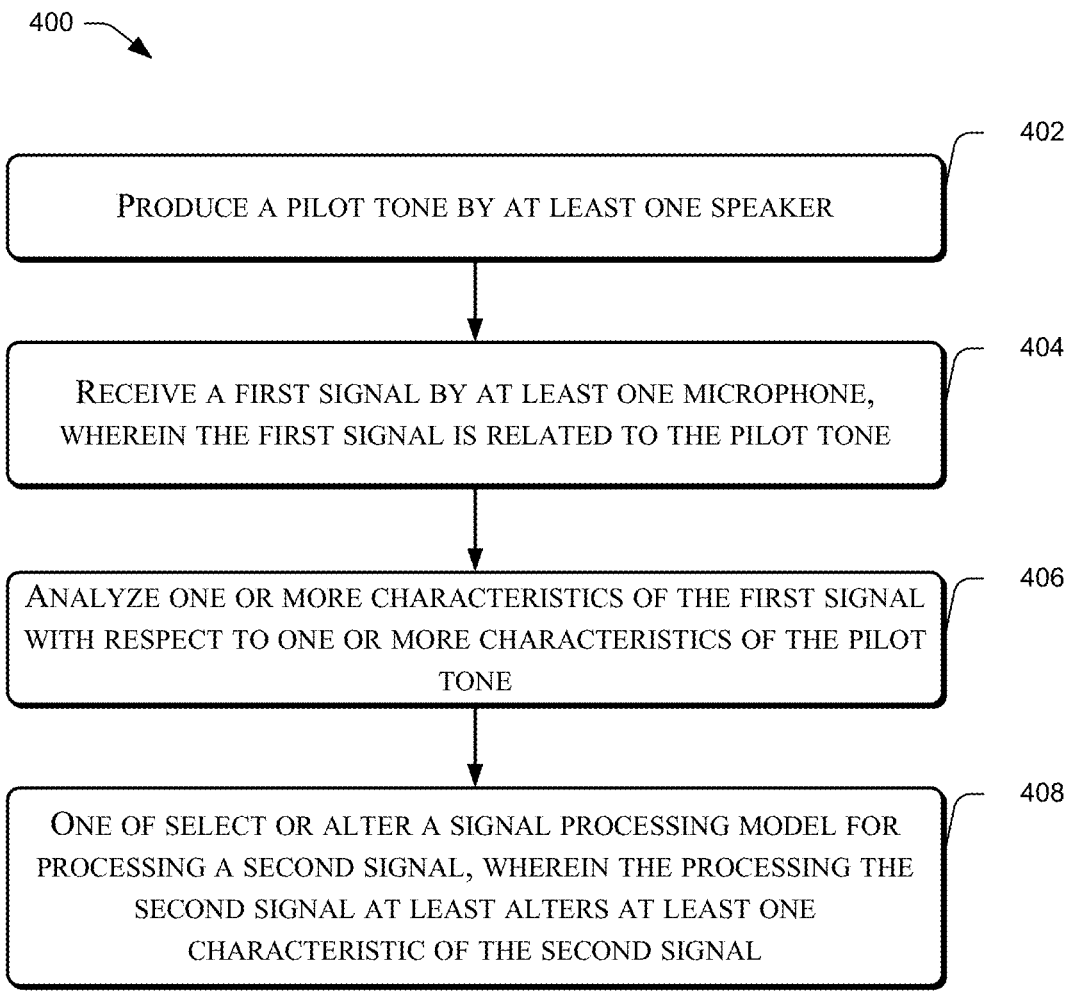
FIG. 4 depicts a flow diagram of an example process of the voice-controlled device characterizing an environment in which the voice-controlled device resides.

FIG. 4 depicts a flow diagram of an example process 400 of the voice-controlled device 106 characterizing an environment that includes the voice-controlled device 106. While this process 400 is described as being performed by the voice-controlled device 106, it is to be appreciated that other computing devices may similarly implement this process and/or other processes described throughout.

Furthermore, this process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 402, the voice-controlled device 106 produces a pilot tone by at least one speaker within an environment that includes the voice-controlled device 106. At 404, the voice-controlled device 106 receives a first signal by at least one microphone of a microphone unit, wherein the first signal received by the at least one microphone is related to the pilot signal and includes one or more characteristics. At 406, the voice-controlled device 106 analyzes the first signal received by the at least one microphone to determine if one or more characteristics of the first signal have been altered with respect to one or more characteristics of the pilot tone. At 408, the voice-controlled device 106, based upon the analyzing the first signal received by the at least one microphone, one of (i) selects a signal processing model for processing a second signal for altering one or more characteristics of the second signal, or (ii) alter a signal processing model for processing a second signal for altering one or more characteristics of the second signal, wherein the processing a second signal at least alters at least one characteristic of the second signal.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus comprising:
   one or more processors;
   one or more microphones; and
   one or more computer-readable media storing computer-executable instructions that, when executed by the one or more processors, cause the one or more processors to perform acts comprising:
   generating a first audio signal based at least in part on first sound captured by the one or more microphones;
   determining, at a first time, one or more first characteristics associated with an environment in which the apparatus resides based at least in part on the first audio signal;
   selecting, based at least in part on the one or more first characteristics, a first signal processing model;
   generating a second audio signal based at least in part on second sound captured by the one or more microphones;
   determining, at a second time that is after the first time, one or more second characteristics associated with the environment based at least in part on the second audio signal;
   determining at least one difference between the one or more second characteristics and the one or more first characteristics, the at least one difference representing a change in an acoustic property of the environment;
   generating a second signal processing model based at least in part on the at least one difference;
   performing speech recognition on the second audio signal using the second signal processing model;
   determining that the apparatus has experienced a threshold amount of movement;
   determining, based at least in part on the apparatus experiencing the threshold amount of movement, one or more third characteristics of the environment; and
   selecting, based at least in part on the one or more third characteristics, a third signal processing model.

2. The apparatus of claim 1, the acts further comprising determining information regarding the environment, the information comprising at least one of a shape or a size of the environment, and wherein the determining the one or more first characteristics is based at least in part on the information regarding the environment.

3. The apparatus of claim 1, the acts further comprising determining a current time of day associated with the first audio signal, and wherein the selecting the first signal processing model is based at least in part on the current time of day.

4. The apparatus of claim 1, further comprising one or more speakers, and wherein:
   the first audio signal comprises an input audio signal;
   the acts further comprise producing an output audio signal for output by the one or more speakers; and
   the first sound captured by the one or more microphones comprises sound produced by the one or more speakers and based at least in part on the output audio signal reflected by one or more surfaces within the environment.

5. The apparatus of claim 4, the acts further comprising outputting the output audio signal by the one or more speakers at a predetermined periodicity.

6. The apparatus of claim 4, the acts further comprising outputting the output audio signal based at least in part on at least one of activation of the apparatus, detection of a particular sound within the environment, detection of movement within the environment, detection of increased light within the environment, or detection of a manual activation of the apparatus.

7. The apparatus of claim 1, the acts further comprising outputting data requesting that a user of the apparatus at least one of move closer to the apparatus or reduce ambient sound in a vicinity of the apparatus.

8. The apparatus of claim 1, wherein:
the first sound captured by the one or more microphones contains first user speech; and
the second sound captured by the one or more microphones contains second user speech.

9. The apparatus of claim 1, wherein the determining that the apparatus has experienced the threshold amount of movement is based at least in part on at least one of:
receiving, via a sensor of the apparatus, data associated with a movement of the apparatus; or
the at least one difference between the one or more second characteristics and the one or more first characteristics.

10. A method comprising:
receiving, from an apparatus, a first audio signal representing first sound captured by one or more microphones of the apparatus;
determining one or more first characteristics of the first audio signal;
based at least in part on the one or more first characteristics, selecting a signal processing model from a plurality of previously stored signal processing models, wherein the signal processing model is associated with a time of day;
receiving, from the apparatus, a second audio signal representing second sound captured by the one or more microphones of the apparatus;
determining one or more second characteristics of the second audio signal;
determining at least one difference between the one or more second characteristics and the one or more first characteristics, the at least one difference representing a change in an environment in which the apparatus resides;
generating an updated signal processing model based at least in part on the at least one difference;
generating, using the updated signal processing model and the second audio signal, a third audio signal;
performing speech recognition on the third audio signal; and
transmitting data associated with a response to the apparatus, wherein the apparatus is configured to output audio associated with the response.

11. The method of claim 10, wherein the first audio signal comprises an input audio signal, the method further comprises producing an output audio signal for output by one or more speakers of the apparatus, and the first sound captured by the one or more microphones comprises sound produced by the one or more speakers based at least in part on the output audio signal and reflected by one or more surfaces within the environment.

12. The method of claim 11, further comprising periodically causing output of the output audio signal on the one or more speakers.

13. The method of claim 11, further comprising producing the output audio signal based at least in part on at least one of activation of the apparatus, detection of a particular sound within the environment, detection of movement within the environment, detection of increased light within the environment, or detection of a manual activation of the apparatus.

14. The method of claim 10, further comprising causing output of data instructing a user of the apparatus at least one of move closer to the apparatus or reduce ambient sound in a vicinity of the apparatus.

15. The method of claim 10, further comprising determining information regarding the environment, the information comprising at least one of a shape or a size of the environment, and wherein the determining the one or more first characteristics is based at least in part on the information regarding the environment.

16. One or more non-transitory computer-readable media storing computer-executable instructions that, when executed by one or more processors, cause the one or more processors to perform acts comprising:
generating a first audio signal based at least in part on first sound captured by one or more microphones of an apparatus residing within an environment;
determining one or more first characteristics of the first sound;
determining a time of day associated with the first audio signal;
determining first acoustic properties associated with the environment based at least in part on the one or more first characteristics;
based at least in part on the one or more first acoustic properties and the time of day, selecting a signal processing model;
performing speech processing on the first audio signal using the signal processing model;
generating a second audio signal based at least in part on second sound captured by the one or more microphones of the apparatus;
determining one or more second characteristics of the second sound;
determining second acoustic properties associated with the environment based at least in part on the one or more second characteristics;
determining a difference between the one or more second acoustic properties and the one or more first acoustic properties;
generating an updated signal processing model based at least in part on the difference;
generating a third audio signal using the updated signal processing model; and
performing speech recognition on the third audio signal.

17. The one or more non-transitory computer-readable media of claim 16, the acts further comprising determining information regarding the environment, the information comprising at least one of a shape or a size of the environment, and wherein the determining the first acoustic properties is based at least in part on the information regarding the environment.

18. The one or more non-transitory computer-readable media of claim 16, wherein the first audio signal comprises an input audio signal, the acts further comprise producing an output audio signal for output by one or more speakers of the apparatus, and the first sound captured by the one or more microphones comprises sound produced by the one or more speakers based on the output audio signal and reflected by one or more surfaces within the environment.

19. The one or more non-transitory computer-readable media of claim 18, the acts further comprising at least one of:
periodically outputting the output audio signal on the one or more speakers; or
outputting the output audio signal on the one or more speakers based at least in part on at least one of activation of the apparatus, detection of a particular sound within the environment, detection of movement within the environment, detection of increased light within the environment, or detection of a manual activation of the apparatus.

20. The one or more non-transitory computer-readable media of claim 16, wherein:

the determining the difference between the one or more second acoustic properties and the one or more first acoustic properties identifies a source of noise within the environment; and the updated signal processing is configured to attenuate the source of noise within the environment.

\* \* \* \* \*